(12) United States Patent  
Schneider

(10) Patent No.: US 7,214,350 B2
(45) Date of Patent: May 8, 2007

(54) DEVICE FOR THE CONTINUOUS BURNING OF CARBON PARTICLES

(75) Inventor: Siegfried Schneider, Vienna (AT)

(73) Assignee: Capital Technology, S.A. (CH)

( * ) Notice: Subject to any disclaimer, the term of this patent is extended or adjusted under 35 U.S.C. 154(b) by 602 days.

(21) Appl. No.: 10/097,071

(22) Filed: Mar. 13, 2002

(65) Prior Publication Data
US 2003/0175174 A1   Sep. 18, 2003

(51) Int. Cl.
B01D 53/54 (2006.01)

(52) U.S. Cl. ...................................... 422/177; 422/180
(58) Field of Classification Search ........ 422/168–171, 422/177, 180; 55/DIG. 30, 523
See application file for complete search history.

(56) References Cited

U.S. PATENT DOCUMENTS

| 3,852,063 | A |   | 12/1974 | Niimi et al. .................. 420/40 |
| 4,515,758 | A |   | 5/1985  | Domesle et al. .............. 60/299 |
| 4,695,333 | A |   | 9/1987  | Inoue et al. ................. 148/306 |
| 5,171,726 | A | * | 12/1992 | Takemura et al. .......... 502/170 |
| 5,228,891 | A | * | 7/1993  | Adiletta ........................ 55/484 |
| 5,378,426 | A | * | 1/1995  | Geibel et al. .................. 419/2 |

FOREIGN PATENT DOCUMENTS

| CA | 2312609    | * | 12/2000 |
| DE | 29 51 316 A1 |   | 7/1981  |
| EP | 0 646 657  |   | 4/1995  |
| GB | 2 074 888 A |   | 11/1981 |
| JP | 55089459   |   | 7/1980  |

* cited by examiner

Primary Examiner—Glenn Caldarola
(74) Attorney, Agent, or Firm—McGlew & Tuttle, PC

(57) ABSTRACT

A device for additive-free, catalytically induced oxidation of solid carbon particles and decomposition of chemical compounds, comprising a converter chamber with compartments, in which porous structure catalyst carrier matrix profiles are mounted, so that a space between the internal diameter of catalyst profiles is connected to an inlet connection of the converter chamber, and a space around the external diameter of the catalyst profiles is connected to an outlet connection into the catalyst chamber. The profiles are mounted so that gas particles reach outlets only by passing through porous profiles. Advantageously, a third opening through which liquid, gaseous media, e.g., $NO_2$, $O_3$ or $H_2O$ or auxiliary means maybe in front of the porous structures. The porous structures are made of catalytically active material with catalytic action at temperatures below 400° C., preferably below 350° C. and especially below 300° C. The low-temperature below 250° C. by $H_2O$ is preferred.

29 Claims, 9 Drawing Sheets

DEVICE FOR THE CONTINUOUS BURNING OF CARBON PARTICLES

FIELD OF THE INVENTION

The present invention pertains to a device that has at least one continuous, ordered and/or unordered, labyrinth passage for the continuous and/or intermittent oxidation/burning off of solid carbon particles in a gas stream containing oxygen for decomposing chemical compounds in a gas stream. The oxidation of the C particles takes place by the unregulated conversion of the C particles in the gas stream into gaseous oxidation products such as $CO_2$ and $H_2O$. The sulfur and phosphorus present are oxidized with the oxygen present in excess in the exhaust gas into $SO_3$ and $PhO_2$. Ashes, thoroughly oxidized particles and metallic components cannot be affected by the device. The device is designed such that oxidized particles, ashes and metallic components arc transported through the device without clogging the free passages of the device.

BACKGROUND OF THE INVENTION

Soot particles consist mainly of elemental carbon (C), which may contain components of high and low volatility in its composition. Without a catalyst and under normal pressure, the C particles burn at temperatures above 500° C. in the presence of oxygen. Hydrocarbons, sulfates, oxides, polycyclic aromatic hydrocarbons, etc., may be deposited on the nanostructures of the carbon particles.

The percentage of the volatile components in the exhaust gas varies depending on the load state of combustion equipment or an internal combustion engine. Volatile particle components can be oxidized in the exhaust gas stream more easily than highly coked particle agglomerates. Emissions of diesel engines are referred to as hazardous substances of Class I and as hazardous and cancer-causing substances in the Threshold Limit Values List (MAK-Liste), see Appendix 1 to the Ordinance on Hazardous Substances (Gefahrstoffverordnung).

Emissions from diesel engines are subject to regulations such as the Technical Rules for Hazardous Substances [Technische Regeln für Gefahrstoffe (TRGS)], in which they are classified as carcinogenic. Exhaust gas limit values of <0.15 g/kWh are currently in force in Europe. The limits will be reduced to <0.05 g/kWh in the European Union according to the "EURO IV Ordinance" beginning from 2005. To meet the limit values, a device with a catalytically active carrier matrix with at least one free passage for the exhaust gases is necessary. The provision of many passages through the matrix increases the conversion capacity in the gas stream, which is also called conversion rate $K_r$.

The device must withstand continuous thermodynamic and mechanical alternating stresses and shock as well as permanent chemical loads. To burn particles in the exhaust gas stream, time must be available in order for energy to be able to act on the particles. Since the soot particles are entrained in the exhaust gas stream at a speed greater than 10 m/sec, and the device must not have a large volume, only a short time is left for the conversion. In order to introduce the needed energy into the particles in a short time and not to compromise the internal combustion engine by an unacceptable back pressure during the process, the following conditions must be met:

1. Open (0.1–0.5 mm) labyrinth channels through the integral carrier matrix monolith,
2. large geometric area of the carrier matrix,
3. large number of contacts (impact) of the particles with the catalyst,
4. selective (multistep) catalytic treatment of the particles and gases,
5. conversion in the temperature window of 180–500° C.,
6. thermal stability of the matrix during exothermal spontaneous reactions,
7. no deposition of ashes at operating temperatures below 800° C.,
8. low back pressure (below 150 mbar),
9. avoidance of the generation of $NO_x$,
10. avoidance of excess $NO_2$; and
11. avoidance of CO emission.

In compliance with the EURO IV/V exhaust gas limit values the passage channels through the device are dimensioned such that they are many times larger than the largest diameter of the largest particle agglomerate ever occurring. Deposition or accumulation of carbon particles cannot thus occur either in the highly loaded state or in the nonloaded operating state of a combustion equipment. The exhaust gas stream is consequently not compromised by the device as a consequence of the dimensioning of the passage channels, regardless of the load state of the combustion equipment. An increase in the back pressure caused by the accumulation of Carbon particles in the device is ruled out when a controlled regeneration is performed if the engine begins to operate above a defined back pressure. A controlled regeneration can be performed by the control engineering system of the combustion equipment itself or by external measures (e.g., auxiliary heater, electric heater, cavity resonator, dipole excitation, high-voltage discharge, dielectrically pulsed low-temperature plasma).

The use of centrifuges, cyclones, particle filters, and oxidation catalysts for separating particles from exhaust gas streams has been known. Small, lightweight and inexpensive devices that make possible the continuous conversion of respirable carbon particles are needed in small, mobile units. Such devices have not become known for small and mobile units (5–120 kW) and have not been used for such units, either. Contrary to this, catalytic filters and oxidation catalysts are used.

According to their physical principle, particle filters tend to exhaust their filter capacity, and the back pressure, which increases due to clogged filter surfaces, opposes the flowthrough of the exhaust gas, especially the separation of respirable particles. This circumstance is unfavorable for the internal combustion engine arranged upstream of the "aftertreatment." In case of a combination of an internal combustion engine with a filter arranged downstream, the internal combustion engine cannot be operated, e.g., at full load when the filter is already exhausted. This may lead to damage to the internal combustion engine.

Additives for filter burn-off, which burn the solid particles in the exhaust gas continuously or intermittently and in a satisfactory manner, are ecologically objectionable. The regeneration of exhaust gas filter cartridges is complicated in terms of control engineering and expensive in terms of handling. Nonregenerable filters, i.e., "disposable filters," represent an ecological problem. Such exhaust gas cleaning units cannot therefore be considered for wide use based on ecological considerations, especially because the filters are exhausted before the end of the normal life cycle and are to be considered to be special waste in case of disposal.

SUMMARY AND OBJECTS OF THE INVENTION

The object of the present invention is to provide a device of a simple design that can be readily manufactured and maintained and makes possible the decomposition of fine particles in the exhaust gas stream without collecting the harmful particles wherein the device is not a filter.

A further object is to provide a good matrix to support a catalyst in which the doping of the fuel or exhaust gas stream with additives is not required because the catalyst, which makes possible a low-temperature oxidation, is firmly anchored on the matrix.

The object of the present invention is to provide a device that can be used in small, mobile units between 5 and 120 kW, which are currently still operated without exhaust gas cleaning. Use of larger combustion equipment is also possible.

According to the invention, a device for oxidizing particles and decomposing of chemical compounds in exhaust gas is provided comprising at least one metallic carrier matrix with surfaces (e.g., three-dimensionally linked pentagon and/or polygon webs) arranged to form labyrinth channels for the catalytic treatment of the exhaust gas. This cylindrical profiled carrier matrix profiles works in concert with at least one additional carrier as an integral composite monolith provided downstream. The design of the cross section profile of the carrier matrix is freely selectable. Any desired hollow space is filled with the carrier matrix and is thus utilized in a space-saving manner. Each carrier matrix (or carrier profile) with labyrinthine channels preferably composed to form integral monoliths may be arranged essentially one behind another. The matrix webs are made of the master alloy FeCr and preferably from $FeCr_{23}V_7Si_{1.5}B_1Y_{0.8}$ or $FeCr_{23}V_7Ce_3Si_{1.5}B_1Y_{0.8}$ and are catalytically coated on their surface. The exhaust gas loaded with the particles and the chemical compounds flows freely through the passages of the matrix. The exhaust gas to be treated, which penetrates with the loaded particles and chemical compounds into the interior space of the device and into the interior spaces of the labyrinth channels, flows out without a significant increase in back pressure.

One advantage of the device is that the exhaust gas loaded with the particles and the chemical compounds to be decomposed is sent from the catalyst carrier matrix monolith module into the cylindrical profiled carrier matrix profiles, and that a uniform pressure distribution and consequently uniform conversion over the entire length of a porous carrier matrix profiles are ensured as a consequence of the conical design inside the device.

During the flow through the open-pore profile carrier, an impact takes place between the particles and the coated webs between the solid carbon particles present in the exhaust gas and the catalytically active coated carrier. The solid particles are pressed by the entraining flow against the surface of the catalyst. The particles thus come into contact with the catalytically active compounds. In the presence of oxygen or other media having an oxidizing action, the carbon particles are oxidized into $CO_2$.

The labyrinth matrix is made of a single-phase, ductile and heat resistant ferritic iron-chromium compound, which has a long-term stability above 1,000° C. The master alloy $FeCr_{23}V_7Si_{1.5}B_1Y_{0.8}$ or $FeCr_{23}V_7Ce_3Si_{1.5}B_1Y_{0.8}$ is preferred, but alloys based on FeCrAl with reduced heat resistance are also used when the use is not intended directly in front of or behind the exhaust gas turbine. The matrix is doped with I. a monolith with bonding agent, wash coat, zeolite and catalyst Pt/Rh/Ce; II. a monolith with bonding agent, wash coat, zeolite and catalyst CeV, which is arranged downstream in the exhaust gas flow; III. a monolith with bonding agent, wash coat, zeolite and catalyst $V_2O_4$, which is placed farther downstream in the exhaust gas flow; and IV. a monolith with bonding agent, wash coat, zeolite and catalyst Pt/Ag, which is arranged farther downstream. This takes place either in the sol-gel process or according to the powder metallurgical method in plasma. Investigations showed that the doping of FeCrVY with 7% of V leads to good results in the in-the-gas conversion when the powder fraction produced according to the powder metallurgical method are in a particle size distribution window of 1 μm to 30 μm. The diameter $d_{50}$ should be below 10 μm.

As far as the structure and the shape of the catalytically active matrix are concerned, there are various designs and shapes, which are preferred within the framework of the present invention. Each structure has catalytic activity for the oxidation of soot particles at least on its surfaces through which the gas flows.

An exemplary embodiment of the device in which the matrix is connected to one another in the manner of a catalytic module is especially preferred. A stabilizer plate, a module plate, which is separated therefrom by means of a spacer element. The catalyst carrier matrix profile fastened thereto, and a baseplate, which holds these at their opposite ends and closes same off, are held in position by connecting rods in spacer tubes and form a catalyst carrier matrix profile module assembly unit. This unit can be pushed into the converter chamber interior space of a converter chamber and can be pulled out of same. The assembly unit can be taken apart into the individual parts.

Such an assembly unit has an advantage because in case of repair or when carriers must be replaced, little time is available for these operations, and the duration of the interruption in operation is therefore reduced to a minimum. Measures can be taken to replace the entire module in such cases, while the damaged module can be repaired or individual carriers can be replaced.

In order to further increase the efficiency of the device according to the present invention concerning the elimination of solid particles and hazardous compounds from the exhaust gases of internal combustion engines, an exemplary embodiment is preferred in which a catalyst CeV is arranged, as described, downstream and in the direction of flow of the exhaust gas. An optional converter chamber inlet catalyst carrier matrix layer is located opposite the converter chamber interior space of the converter chamber or a converter chamber intermediate space of the converter chamber against the module plate. This inlet matrix layer is dimensioned corresponding to an inner cross-sectional area ($q_2$) of the converter chamber, it covers the stabilizer plate and the stabilizer plate openings. The inlet matrix layer may consist of the open-pore sintered carrier FeCr with the catalyst CeV, and may be arranged in front of the stabilizer plate.

The device being provided according to the invention is neither a particle filter nor a catalytic filter and must not be compared with the principle of a filter in the comparative testing. The device being presented does not collect particles as does a filter. This is true as long as no exothermal reactions above 800° C. occur in the device. If exothermal reactions develop in the device, ashes and additives may react with the surface of the matrix and clog the free passages over time, depending on the frequency of the exothermal reactions. The device consists of a lightweight, temperature-resistant (melting point above 1,500° C.) carrier matrix material manufactured according to powder metallurgical technology, which has labyrinth ducts permeable to gases and particles, preferably from the material $FeCr_{23}V_7Y_1$, $FeCr_{23}V_7Ce_1$ or FeCrVSi, which is coated with at least one catalyst based on PtCe. The coating of the inner surface through which the gas stream flows is carried out according to the sol-gel or plasma process. No wash coat is necessary for the durable coating of the $FeCr_{23}V_7Y_1$, $FeCr_{23}V_7Ce_1$ or FeCrVSi matrix. The carrier matrix substrate from $FeCr_{23}V_7Y_1$, $FeCr_{23}V_7Ce_1$ or FeCrVSi in the form of a spatial profile, e.g., an open-cell cylinder, or a sequence of identical arrangements of cylinders (cascade/monolith) is coated with the catalyst base PtCe on the surface over which the gas stream flows and the carrier matrix located deeper in the exhaust gas stream is coated with CeV. In a meaningful arrangement for low-temperature oxidation of carbon with $H_2O$, which is possible around 200° C., the first carrier matrix monolith in the device is coated with PtCe, and the monolith following it in the exhaust gas stream is coated with CeV.

The meaningful sequence of the carrier matrix monoliths with catalytic coating, which are arranged one after the other (arrangement and sequence), is designed as an ascending cascade, i.e., from a plurality of elements, all with different matrix structures (increasing fineness of the cell structure). The carrier matrix monoliths are thermally and electrically insulated against the outer skin (housing). If internal regeneration (cleaning to remove C deposits) is required, the metallic carrier matrix is insulated against the outer skin and the adjoining carrier matrix 1.) thermally and, if necessary 2.), electrically. The electrical insulation is performed in such a manner that an electric nonconductor is arranged between an electrically conductive carrier matrix each. The insulating carrier is preferably made from SiC, $Al_2O_3$ or zeolite. It should be ensured that the arrangement and the sequence of the carriers shall always be designed as an ascending integral cascade with increasing cell count (integral monolith). This is preferably accomplished such that, e.g., a ceramic matrix with free passages of open cells measuring 0.25 mm is arranged behind a metallic matrix, which has free passages, e.g., open cells with a diameter of 0.5 mm. The type of the labyrinth passages is the same in both cases, either metallic or nonmetallic. The carrier matrix, which may consist of the temperature-resistant, thermodynamically and chemically stable and shock-resistant material $FeCr_{23}V_7Y_1$, $FeCr_{23}V_7Ce_1$ or FeCrVSi, may be optionally heated directly or indirectly by means of a heating agent. If the heating is performed directly, the electrically conductive monolith, which is electrically insulated against the housing and the adjoining monoliths, may be provided as a resistance heater. Such a selection of a regeneration is advantageous only if it is ensured that regeneration cycles are run only during low load phases, e.g., $800-1,000^{-1}$. In any case, it shall be ruled out that the regeneration cycles are run with the plant shut down. If the oxidation shall be induced indirectly, a heat source or an $NO_2$ or $O_3$ source may be arranged in front of the monoliths or the cascade-like carriers according to the example shown in FIG. 1. Any other arrangement directly in front of the monolith or the cascade-like carriers is possible according to the state of the art.

The efficiency of the Carbon particle aftertreatment according to the principle described is between 75% and 85% for gas conversion as determined on the test stand with 190-kW and 340-kW diesel engines. A higher conversion in the gas stream is possible if controllable agreements are made between the combustion equipment and the aftertreatment unit.

To guarantee flow through long passage channels for the exhaust gas in the device, the diameter of the labyrinth channel must be preferably greater than the diameter of the individual particles, or several times the diameter of the individual particle. A plurality of passage channels, e.g., with channel passages between 0.5 mm and 0.1 mm, are preferred.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
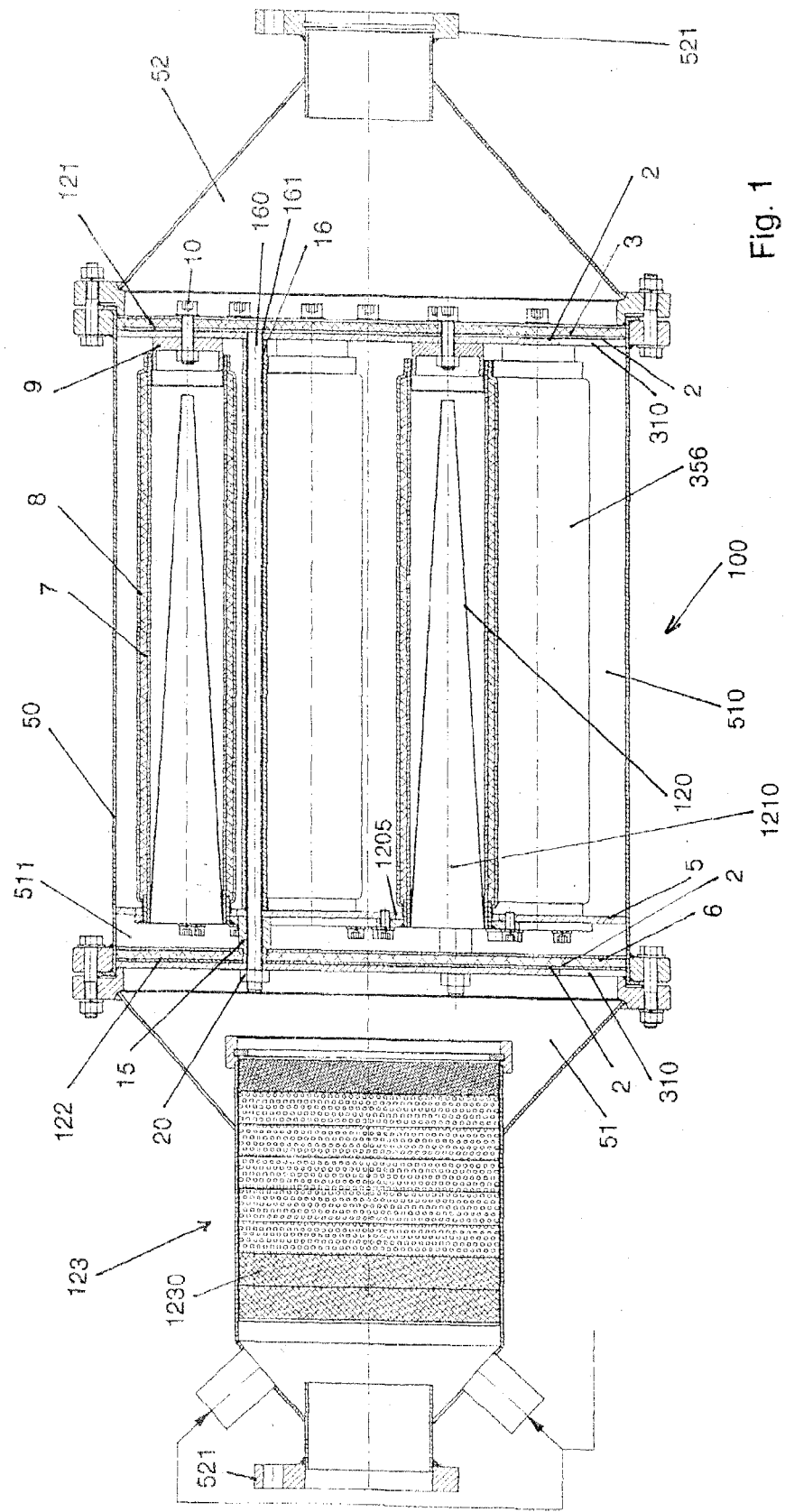
FIG. 1 is a cross-sectional view of an exemplary embodiment for the oxidation and burning of exhaust gas particles according to the present invention.

Referring to the drawings in particular the invention provides and exhaust treatment device 100 as shown in FIG. 1 for oxidizing exhaust gas particles. The device 100 comprises essentially a Converter chamber 50, which has an essentially expanded cross section $q_1$ and is cylindrical in this case. The converter chanber 50 has an inlet side with an approximately conically expanding inlet chamber 51 for the exhaust gas from internal combustion engines (or waste gas from plants). The converter chamber 50 has an exhaust gas outlet side with a conically tapering outlet chamber 52 for essentially cleaned exhaust gas. The inlet chamber 51 is connected to the converter chamber 50 and the outlet chamber 52 is connected to the converter chamber 50 detachably but in a gas-tight manner.

The converter chamber 50 shown in FIG. 1 begins with a flange 521 and associated pipe, which can be connected to a exhaust gas pipe (not shown). The flange 521 and associated pipe has an inner cross section $q_1$ corresponding to the exhaust gas pipe. The exhaust gas outlet chamber 52 ends with the same inner cross section $q_1$, and this also carries a flange 521 at its end.

A catalyst carrier matrix profile module assembly unit 356 can be disposed in the converter chamber 50 and can be pulled out of the chamber 50. The module assembly unit 356 comprises a baseplate 3 with an area extension or cross-sectional area corresponding to the inner cross-sectional area $q_2$ of the converter chamber 50. The baseplate 3 limits the end of the assembly unit 356. A module plate 5 is arranged at a spaced location from the base plate 3 and limits the other end of the converter chamber 50. A plurality of catalyst carrier matrix profiles 120 are provided in the assembly unit 356. The matrix profiles 120 have walls consisting essentially of the sintered material FeCr, $FeCr_{23}V_7Y_1$, $FeCr_{23}V_7Ce_1$ or FeCrVSi which is permeable to exhaust gas. The matrix profiles 120 extend between the baseplate 3 and module plate 5. These catalyst carrier matrix profiles 120 end at the mounting flanges 1205, which are fastened to the module plate 5 on the outside.

The catalyst carrier matrix profile module assembly unit 356 is held by connecting rods 160, which are guided in spacer tubes 16, which extend between the base plate 3 and module plate 5 and by means of which the base plate 3 and stabilizer plate 6 are connected. At least the stabilizer plate 6 shown in the left-hand part of FIG. 1 is detachably connected to the connecting rod 160 by means of gas permeable brackets 20.

The distance between the stabilizer plate 6 and the module plate 5, on which the open ends of the catalyst carrier matrix profiles 120 are held, is secured by means of the spacer elements 15, which extend between the module plate 5 and stabilizer plate 6 or are accommodated there. This results in the formation of the converter chamber intermediate space 511. The above-described catalyst carrier matrix profiles 120 are arranged between the inner and outer support tubes 7, 8, which are made, e.g., of perforated sheet material and are closed at their ends with closing/centering elements 9, which are introduced into same and are held with the bolts 10. The catalyst carrier matrix profiles 120 and the inner and outer support tubes 7, 8 surrounding the matrix profiles 120 with their end faces through the module plate 5 and are open into the converter chamber intermediate space 511.

To achieve the maximum conversion of solid particles from the exhaust gas stream of an internal combustion engine, at least one sintered, open-cell catalyst carrier matrix monolith module 123 formed of FeCrVY ($FeCr_{23}V_7Y_1$, $FeCr_{23}V_7Ce_1$ or FeCrVSi) is provided in or at the intake entrance of the exhaust gas inlet chamber 51. Catalyst carrier matrix monolith module 123 is coated on its inner surface with PtCe or with another Catalyst as discussed further below. The module 123 includes several sintered individual catalyst carrier matrix monolith disks 1230. These may have a cell size that is progressively smaller from the intake toward the discharge side. The cell size of the disks 1230 is e.g., 0.5 mm in the first disk counted from the exhaust system, 0.25 mm in the second matrix disk and 0.1 mm in the third matrix disk. The matrices or disks 1230 following thereafter have a cell size of 0.1 mm. The module 123 has a cross sectional passage of q3.

The exhaust gas arriving from the internal combustion engine passes through the module 123 and can flow through the open passages of the stabilizer plate 6 and the porous converter chamber inlet catalyst carrier matrix layer 122 and into the converter chamber 50. Downstream, the exhaust gas enters the catalyst carrier matrix profile interior spaces 1210. Through the inner and outer support tubes 7, 8, the gas flows into the convener chamber interior space 510. The exhaust gas flows through the catalyst carrier matrix profiles 120 consisting of sintered carrier material fibers formed of $FeCr_{23}V_7Y_1$, $FeCr_{23}V_7Ce_1$ or FeCrVSi of <35 µm in size during the flowing process. These matrix profiles 120 are jacketed with a CeV catalyst over their entire surface. The full-surface jacketing of the carrier material sintered fibers with CeV is possible in the reducing plasma beam. The exhaust gas, which has been subjected to two catalytic treatments, I. PtCe at module 123 and II. CeV at matrix profiles 120, is entrained through the porous sintered material farther downstream. Both the converter chamber inlet catalyst carrier matrix layer 122 and the converter chamber outlet catalyst carrier matrix layer 121 are arranged between two perforated plates 2.

Figures 2, 3:
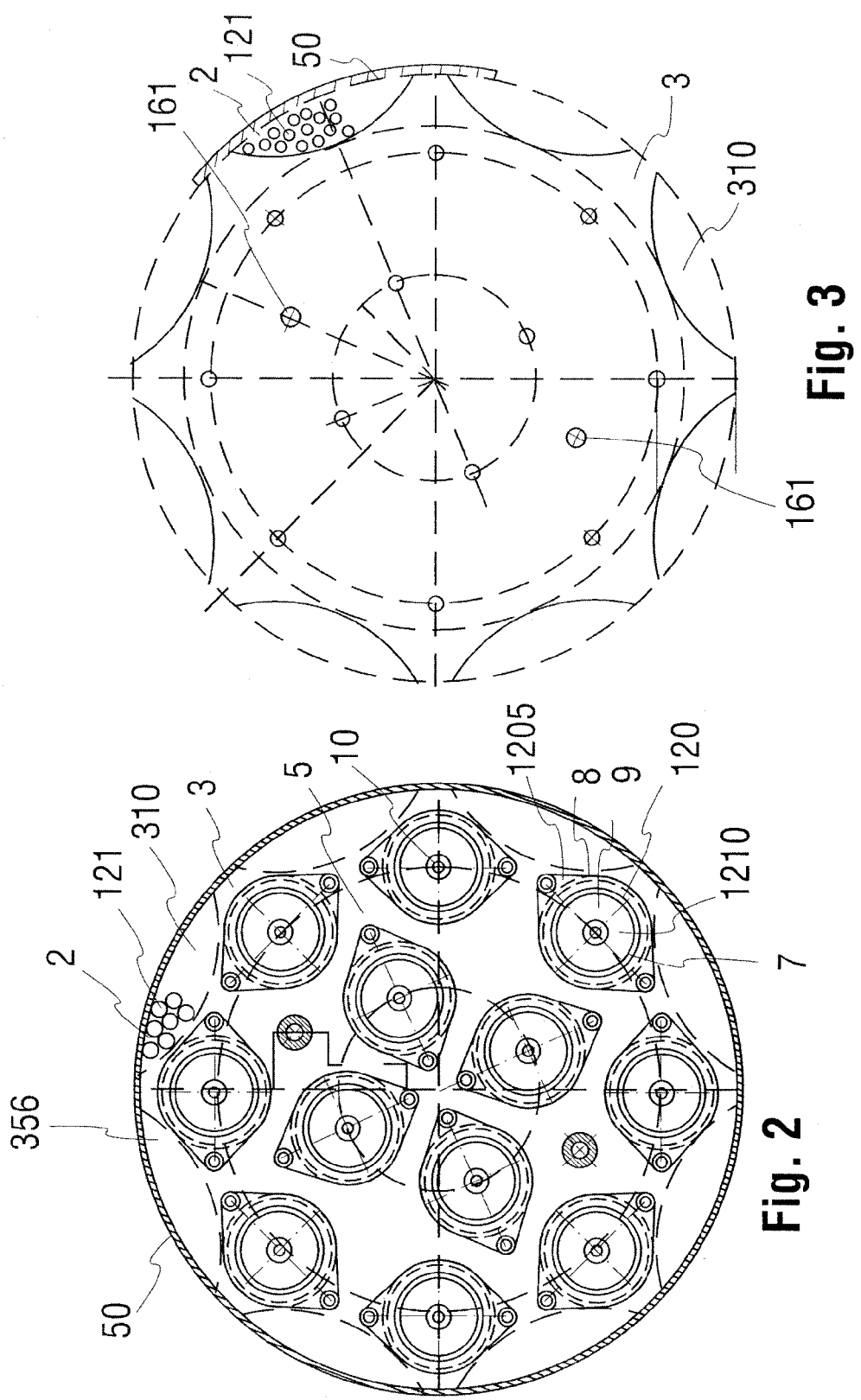
FIG. 2 is a front view of the converter chamber.
FIG. 3 is a representation of the stabilizer plate of an embodiment according to the present invention in a front view.

The view of the catalyst carrier matrix profile module assembly unit 356 in the converter chamber 50, which is shown in FIG. 2, shows the module plate 5 in its full form and the ends of the catalyst carrier matrix profiles 120 with their inner and outer support tubes 7, 8, of which only one is shown, which is fastened with a mounting flange 1205 to the module plate 5 by means of nuts and bolts. The ends of the catalyst carrier matrix profiles 120 are open on the exhaust gas outlet side and pass through 12 corresponding, round openings of the exhaust gas outlet module plate 5, which are arranged in a uniformly distributed pattern on the round surface.

The closing/centering elements 9 for the catalyst carrier matrix profiles 120, which form the closures at the same time and are fastened by means of the bolts 10 to the baseplate 3 which is located directly behind the module plate 5, can be seen at the diametrically opposed ends of the catalyst carrier matrix profile interior space 1210 of the catalyst carrier matrix profiles 120. The catalyst carrier matrix profile module assembly unit 356 is provided with at least one converter chamber outlet catalyst carrier matrix layer 121 in the form of a porous sintered mat, and/or with a converter chamber inlet catalyst carrier matrix layer 122. Preferably, the catalyst carrier matrix layer 121 is provided, comprising at least one of the above-mentioned two catalyst layers, which limit the inner cross section of the catalyst chamber. The perforated plates 2, between which the converter chamber outlet catalyst carrier matrix layer 121 is arranged, are likewise held by these bolts 10. The contours of the peripheral openings 310 of the baseplate 3, of which there are eight, are likewise indicated by a broken line.

FIG. 3 shows a view of the baseplate 3, which is represented by broken lines in FIG. 2. The arrangement of the 12 small holes can be clearly seen here. Bolts, which ultimately hold the closing/centering elements and the ends can pass through the holes. Two openings 161 receive the connecting rods 160, which are used to hold the catalyst carrier matrix profile module assembly unit 356. FIG. 3 shows clearly that the baseplate 3 has a star-shaped profile because of the circle segment-shaped openings on its outer circumference, and these segment contours limit the peripheral openings 310 with an approximately spindle-shaped cross section together with the wall of the converter chamber 50, which is represented fully in one surface only.

The device being provided according to the invention is neither a particle filter nor a catalytic filter and must not be compared with the principle of a filter in the comparative testing. The device being presented does not collect particles as does a filter.

In case of the replacement of the carrier structure sintered according to the pressureless method with a sintered metal mat, e.g., one made of the material FeCrAl, permanent regeneration by means of the exhaust heat of the engine, $NO_2$, $O_3$, plasma or $H_2O$ is to be obligatorily provided by the design, because sintered metal mats consisting of fibers of <30 µm tend to clog the passages. Sintered 3D metal mats make it possible to reach efficiencies that permit more than 99.9% separation of carbon particles from exhaust gases. Separation efficiencies that proved a separation higher than 99.9% were measured for carbon particles with the embodiment of the device. The separation performance was determined without additives in the diesel fuel or exhaust gas flow and with a sulfur content exceeding 150 ppm in the diesel fuel. It should be borne in mind when designing the device that the material FeCrAl tends to complete oxidation in the case of wall thicknesses of <30 µm and in the presence of oxygen. The metallic carrier is therefore to be doped with a bonding agent, e.g., $SiO_2$, with a wash coat $Al_2O_3$ built up on the latter, and with the catalyst $V_2O_5$ or CeV only thereafter. The doping with the catalyst has to be between 1 and 2 g per $dm^3$. Doping in plasma leads to a rate of deposition between 1.5 and 2 g per $dm^3$.

The catalyst module 356 is provided with at least one catalyst layer, porous matrix 121 and a catalyst layer 122 of at least one of the above-mentioned two catalyst layers, which limit the inner cross section of the catalyst chamber.

Figure 4:
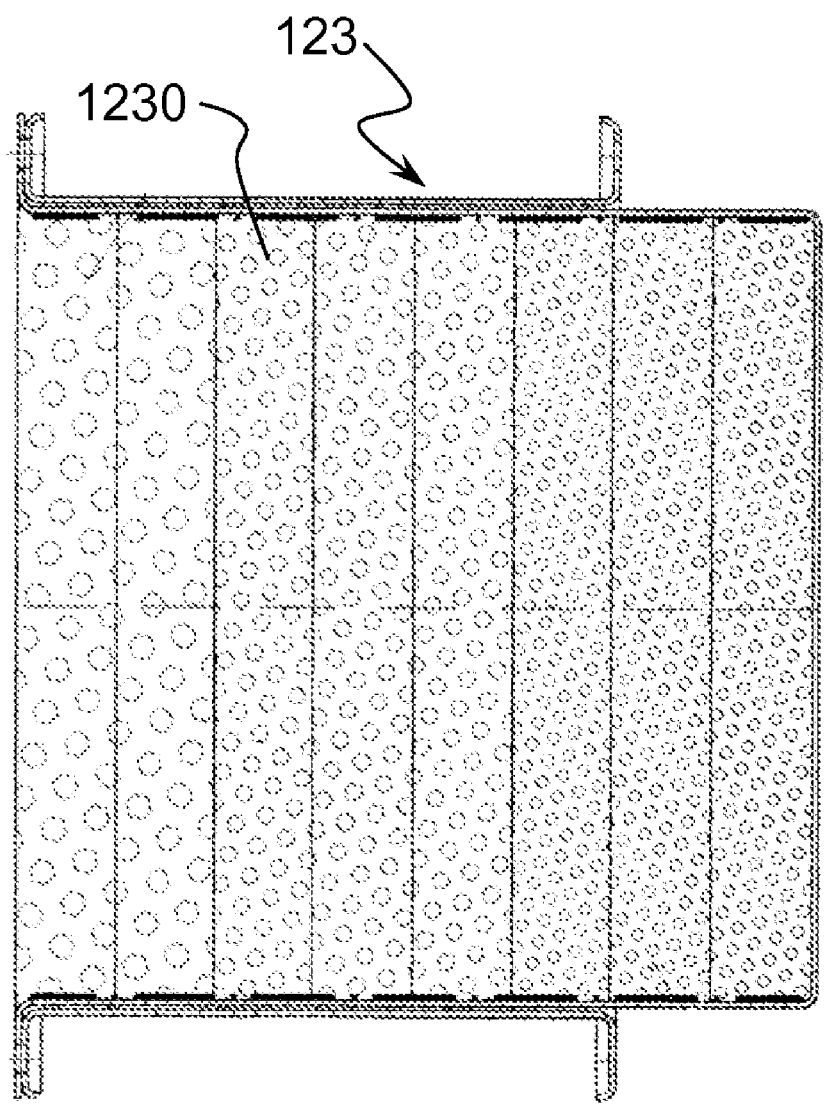
FIG. 4 is a cross-sectional view of the catalyst carrier matrix monolith module.

As shown in FIG. 4, the catalyst carrier matrix monolith module 123, which is formed from any number of carriers or disk-shaped individual catalyst carrier matrix monolith bodies 1230, can accommodate both metallic and nonmetallic carriers of equal diameter. The catalyst carrier matrix monolith module 123 may advantageously have a multipart design, wherein the individual carriers that form same and are arranged adjoining one another may be manufactured from materials or structures of the same kind. The individual catalyst carrier matrix monolith bodies 1230 are made of the material $FeCr_{23}V_7Y_1$, $FeCr_{23}V_7Ce_1$ or FeCrVSi. The individual bodies 1230, which form the module 123, are preferably manufactured from porous carrier profiles of various pore sizes (with the cell count increasing with the exhaust gas stream). A device in which the exhaust gas that is to flow through the catalyst carrier matrix profiles 120 with catalytic action flows through a converter chamber outlet catalyst carrier matrix layer 121, the converter chamber inlet catalyst carrier matrix layer 122 and the catalyst carrier matrix monolith module 123, and in which all the open-pore carriers mentioned are installed in a cascade overall configuration according to FIG. 1. The cascade catalyst built up selectively on the monoliths is structured as follows: 1st monolith with bonding agent, wash coat, zeolite and catalyst Pt/Rh/Ce; 2nd monolith with bonding agent, wash coat, zeolite and catalyst CeV, $CeV_4$ (cerium vanadate), which is arranged downstream in the exhaust gas flow; 3rd monolith with bonding agent, wash coat, zeolite and catalyst $V_2O_4$, which is arranged farther downstream in the exhaust gas flow; and 4th monolith with bonding agent, wash coat, zeolite and catalyst Pt/Ag, which is arranged farther downstream.

The device can be operated without additive to the fuel or to the exhaust gas and without the addition of additives. An additional lowering of the reaction temperature by adding chemicals to the fuel is not necessary, because the device performs the regeneration with an open system in the low-temperature window between 180° C. and 300° C. An internal or external regeneration, which was hitherto necessary at certain intervals even in case of the use of additives, is eliminated, because the device has no filter that can become clogged. The regeneration can be supported by the injection of water. The addition of $H_2O$ by injection according to this process presents an environmentally friendly regeneration process for the future.

Consequently, containers for additives, injection devices, feed lines and controls for coordinating the fuel, the combustion air and the exhaust gas can be eliminated as long as no selective exhaust gas treatment is required. In the design being presented, the device is a device that operates in an "unregulated" manner and exclusively with the thermal possibilities of the combustion equipment operating upstream.

Figure 5:
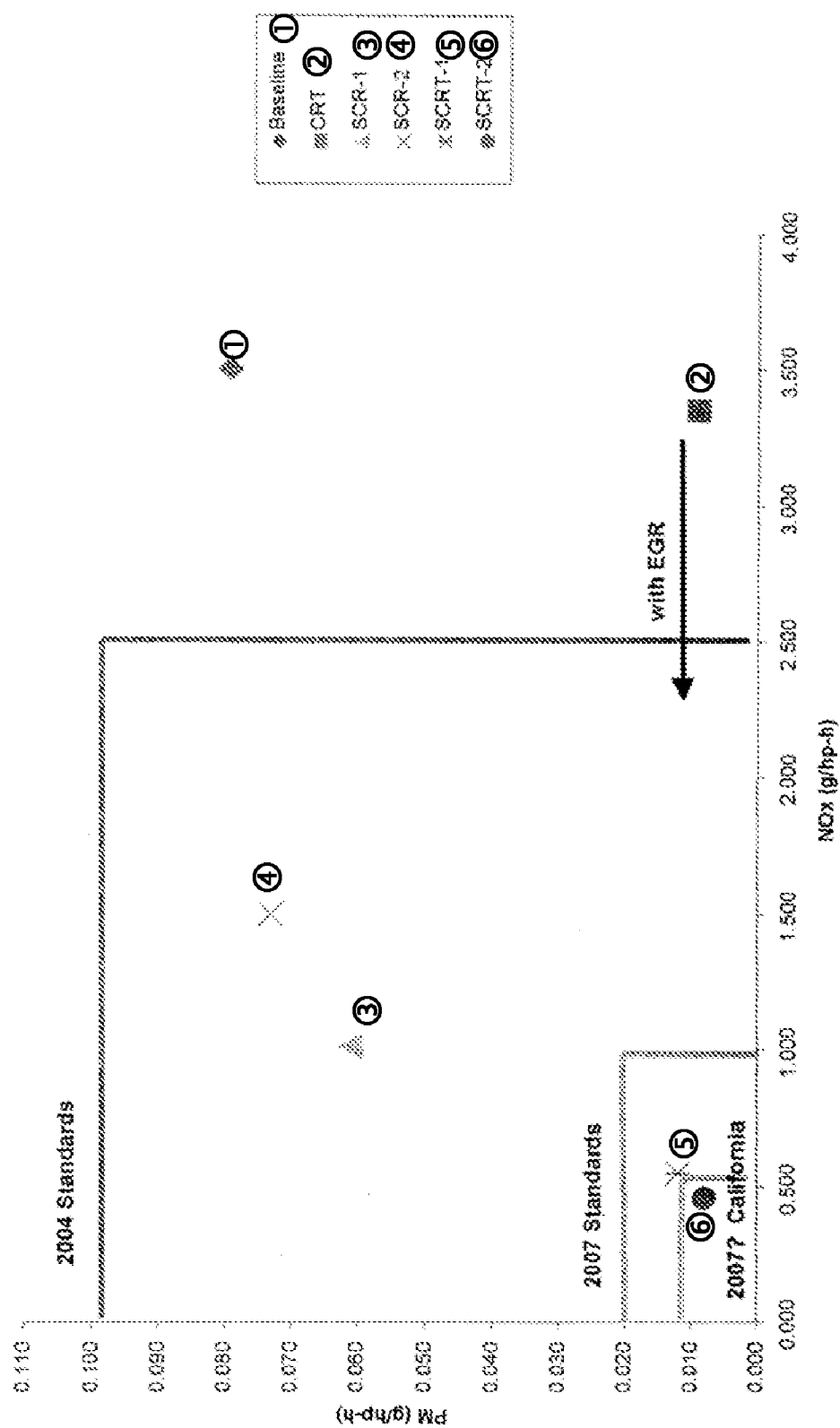
FIG. 5 is a representation of the up-coming emission standards.

FIG. 5 shows a representation of the up-coming emission standards which are predicted to be in place for heavy duty diesel exhaust emissions. Represented are the standards for particulate matter emissions as well as standards for Nitrogen Oxide emissions in future years.

Figure 6:
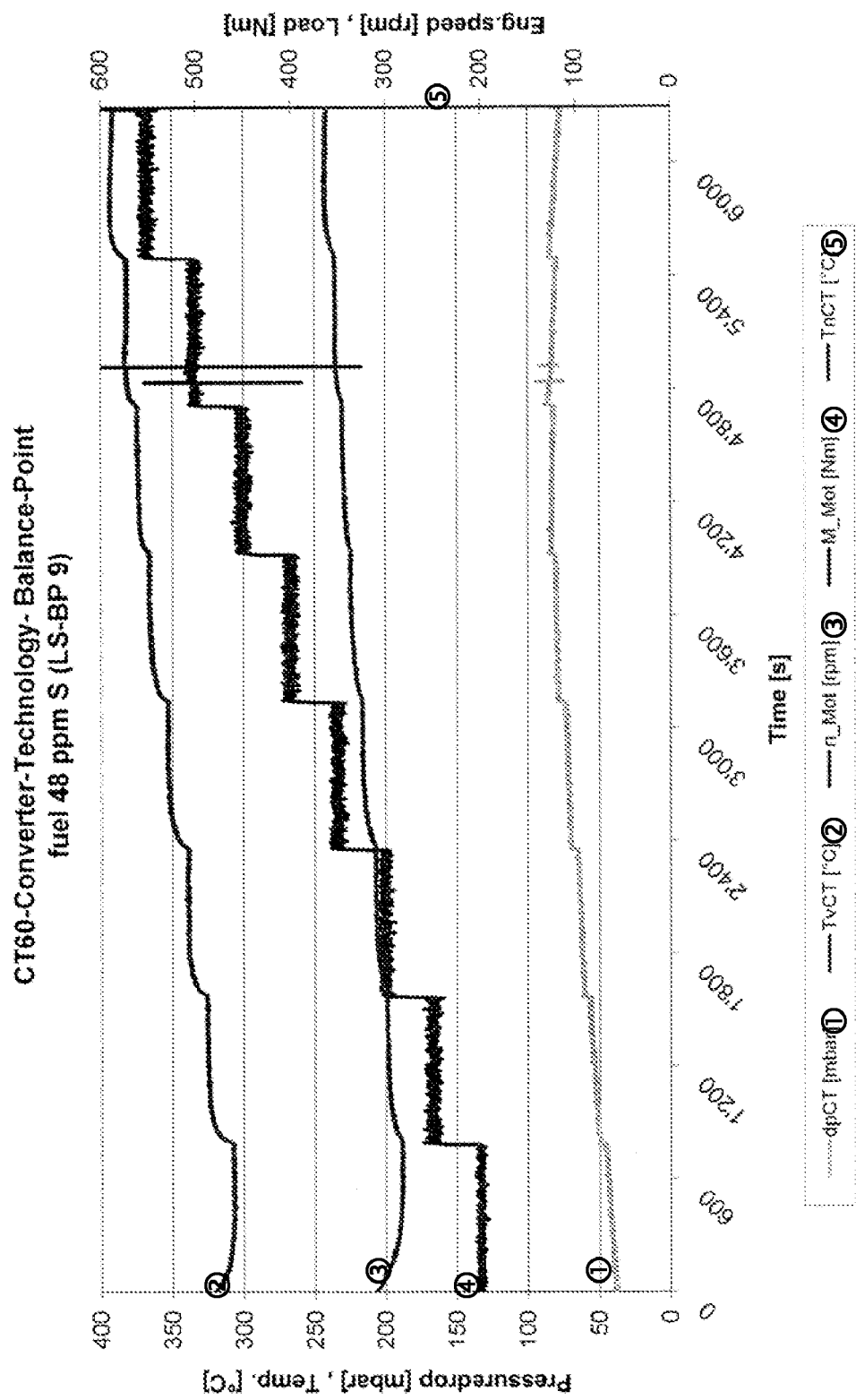
FIG. 6 is a graph showing balance points for pressure drop, operating temperature and engine speed and load versus time for the present invention.

FIG. 6 shows balance points for operating temperature and exhaust back pressure in relation to engine speed and load. Information in this graph can be used to predict how the converter will perform under different operating conditions.

Figure 7:
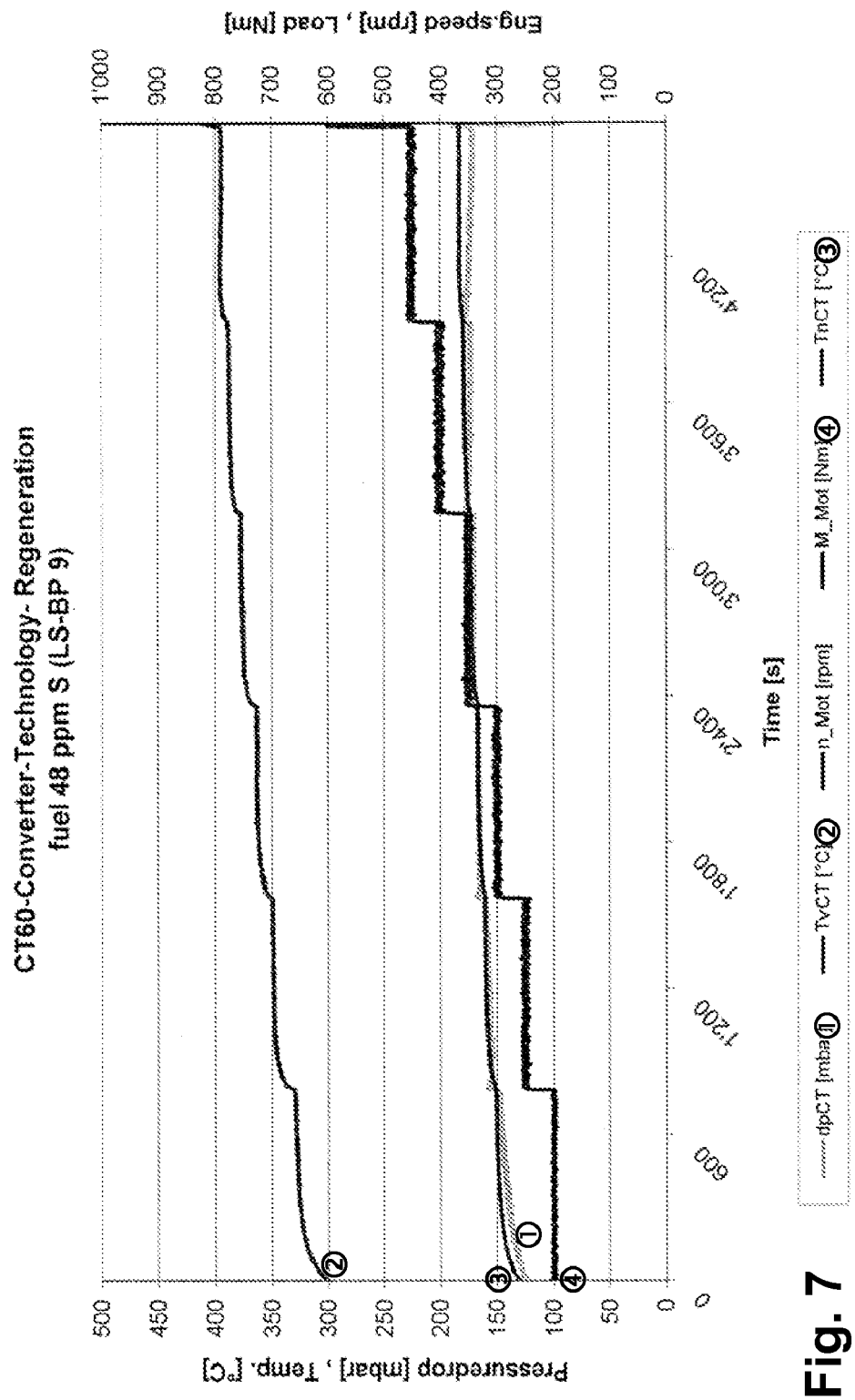
FIG. 7 is a graph showing regeneration conditions for pressure drop, operating temperature and engine speed and load versus time for the present invention.

FIG. 7 shows converter regeneration in relation to engine speed and load. Information in this graph can be used to predict how the converter will perform under different operating conditions.

Figure 8:
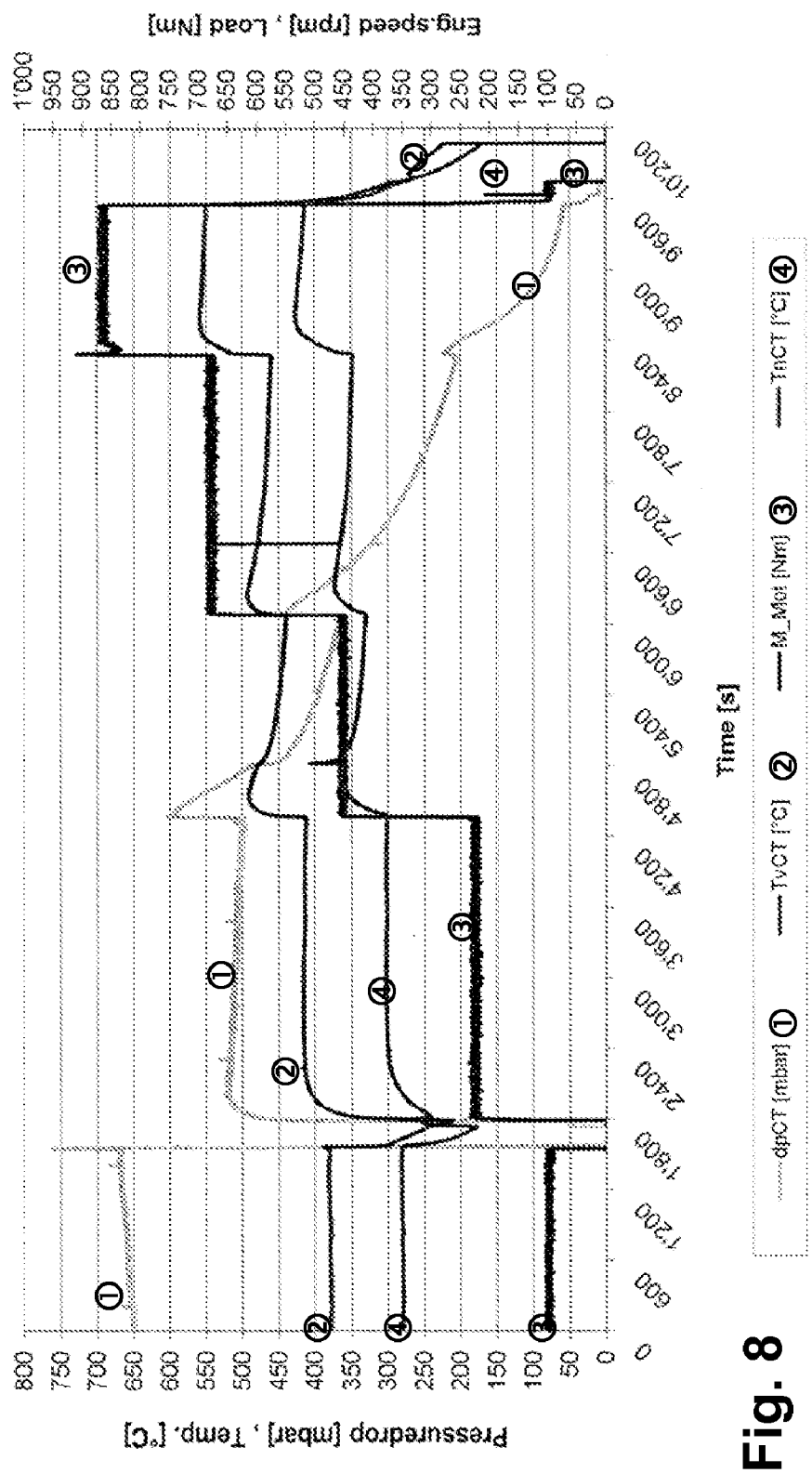
FIG. 8 is a graph showing regeneration cycles for pressure drop, operating temperature and engine speed and load versus time for the present invention.

FIG. 8 shows the changes in operating conditions before during and after converter regeneration in relation to engine speed and load. Information in this graph can be used to predict how the converter will perform under conditions where particulate matter builds up in the converter requiring regenerative cycles to occur.

Figure 9:
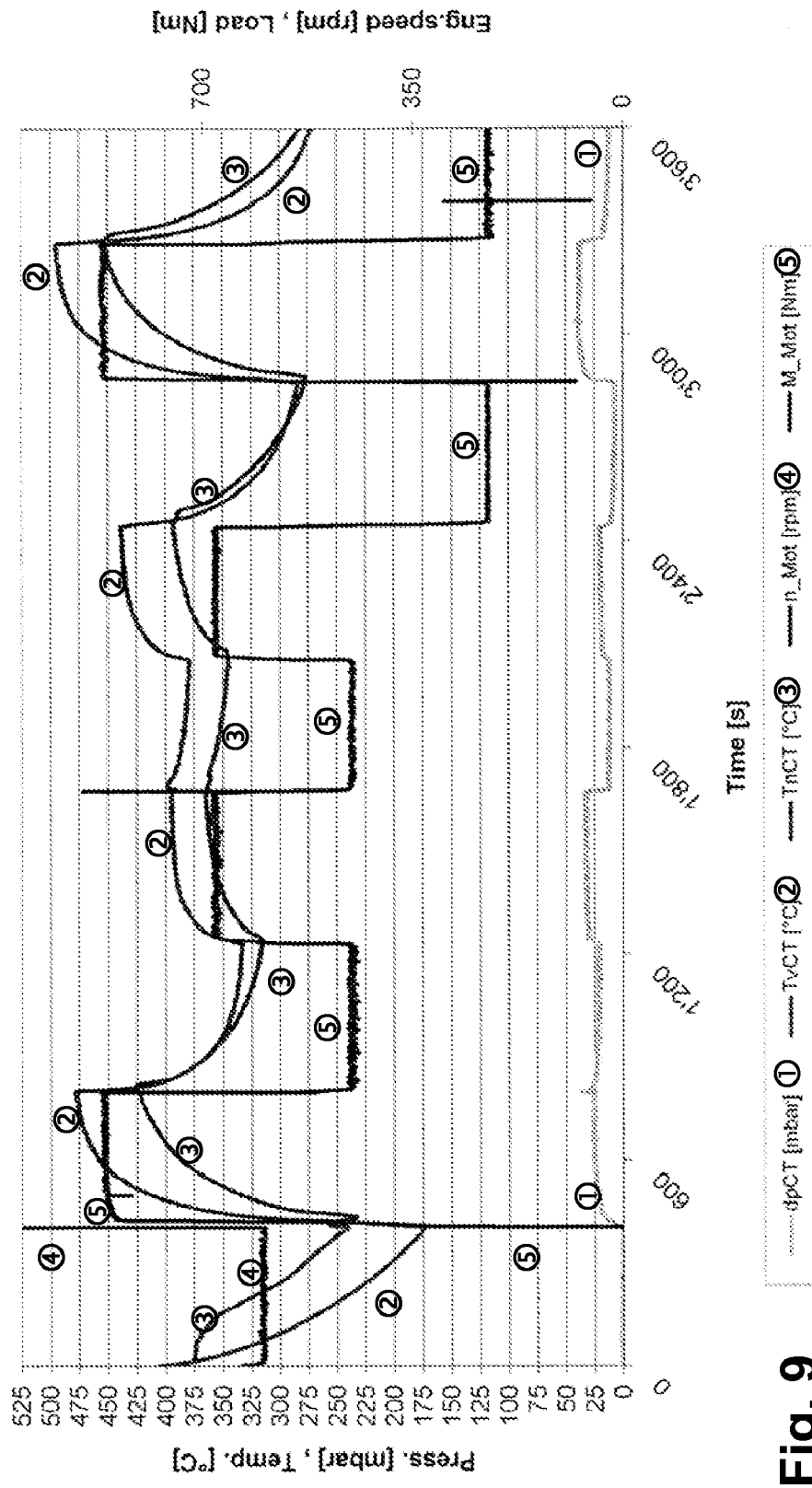
FIG. 9 is a graph showing ACEA 13 cycles for pressure drop, operating temperature and engine speed and load versus time for the present invention.

FIG. 9 shows the changes in operating conditions with ACEA 13 cycles in relation to engine speed and load. Information in this graph can be used to predict how the converter will perform under conditions where ACEA 13 cycles are used to maintain the performance characteristics of the converter under different operating conditions.

As an alternative to the catalyst material described above for the matrix module 123 and for the matrix profile 120, according to a preferred embodiment of the invention, the catalyst material consists essentially of $CeVO_4$ (cerium vanadate). Besides $CeVO_4$, it is also possible to use $V_2O_5$ as the catalyst. The partial replacement of cerium with other lanthanides may be performed to improve the catalytic properties. The ferritic steel carrier ($FeCr_{23}V_7Y_1$, $FeCr_{23}V_7Ce_1$ or FeCrVSi) described above forms the matrix with the catalyst material. This carrier material may also be used with an open-cell structure or as a sintered mat from cut steel fibers of <35 µm in order to obtain a large surface.

Vanadium as an alloying component may be added in amounts of up to 7% in order to improve the thermal and chemical properties of the matrix. The $CeVO_4$ and $V_2O_5$ are applied to the carrier material in the form of a hot gas spray melt (plasma).

To provide a plurality of passage channels, the wall thicknesses of the matrix must be reduced. It was possible to demonstrate in investigations with metal powders based on $FeCr_{23}V_7Y_1$ or $FeCr_{23}V_7Ce_1$ that wall thicknesses of 20 µm can be obtained with a material that has powder particle diameters between 1 µm and 40 µm. The fractions demonstrated in the powder had particles between 600 nm (nanometer) and 45 µm. The mean diameter $d_{50}$ was below 10 µm. Since the particles and their agglomerates to be oxidized in the exhaust gas stream have a diameter of <1 µm, the particles present in the exhaust gas stream are not entrained through the labyrinth channels of the device.

The webs of the labyrinth matrix 123 and the matrix 120 are made as an example and preferably from the metal alloy $FeCr_{23}V_7Si_{1.5}B_1Y_{0.8}$ or $FeCr_{23}V_7Ce_3Si_{1.5}B_1Y_{0.8}$, and the alloy is coated with at least one bonding agent consisting of Al or Cu, a wash coat consisting of $Al_2O_3$, a zeolite consisting of $Al_2O_3$ or $SiO_3$ and, e.g., the catalyst CeV.

To increase the surface from 0.8 m$^2$ to more than 500 m$^2$ per dm$^3$, the coatings on the webs (bonding agent, wash coat, zeolite and catalyst) advantageously consist of: a) a bonding agent, e.g., Cu, Al or Si; and b) a surface-active wash coat such as $Al_2O_3$ and c) a zeolite, e.g., $Al_2O_3$ or $SiO_2$ with a surface of 400–1,000 m$^2$ per g, and d) the catalysts Pt/Rh/Ce, CeV, $V_2O_5$, Pt/Ag.

The catalysts are deposited in a plasma deposition, sol-gel or by washing in into the zeolite. To reach a high efficiency, which reduces the particles to the respective legally required limit values, e.g., four catalyst carriers (integral composite matrix monoliths) with, e.g., a bonding agent consisting of Al, a wash coat consisting of $Al_2O_3$, a zeolite consisting of $Al_2O_3$ and, e.g., four catalysts Pt/Rh/Ce, CeV, $V_2O_4$, Pt/Ag are provided in the device being presented. These may be: A) An integral cascade monolith with bonding agent, wash coat, zeolite and catalyst Pt/Rh/Ce; B) An integral cascade monolith with bonding agent, wash coat, zeolite and catalyst CeV; C) An integral cascade monolith with bonding agent, wash coat, zeolite and catalyst $V_2O_4$; and D)An integral cascade monolith with bonding agent, wash coat, zeolite and catalyst Pt/Ag.

The larger and more active the catalytically active contact surfaces of the cell web become, the higher is the rate of conversion of carbon into $CO_2$. It was possible to demonstrate in investigations carried out so far with sol-gel coatings that more than 1 g per dm$^3$ can be deposited on the webs of the matrix. A zeolite with an inner surface larger than 500 m$^2$ per g increases the geometric surface of the matrix webs from 0.8 m$^2$ per dm$^3$ to more than 500 m$^2$ per dm$^3$. The bonding agent Al or Cu assumes a multiplying function together with the $NO_x$ absorbers. This agent may be: I) A bonding agent for long-term strength between matrix and catalyst/absorber II) An enlargement of the surface and catalytic activator; III) a $NO_x$ binder and selective hydrocarbon exchanger of HC into $H_2O$ and $CO_2$; and IV) A carrier substrate for a blocking catalyst.

The cell structure comprising matrix disks 1230 and or matrix profiles 120 consisting of $FeCr_{23}V_7Si_{1.5}B_1Y_{0.8}$ or $FeCr_{23}V_7Ce_3Si_{1.5}B_1Y_{0.8}$ may be designed in the form of a profile of any shape, e.g., arrangements of elliptical profiles as an ellipsoid, an arrangement of cylindrical disks as cylinders, etc., or as an arrangement of symmetrical and/or asymmetrical profiles as "integral composite monolith" with increasing cell count. Each composite monolith may be coated on the surface of the cell webs with a bonding agent consisting of pure Al, Cu or Si, a wash coat based on $Al_2O_3$ or $SiO_2$, a zeolite based on $Al_2O_3$ and at least one of the catalysts described as examples below in order to ensure the function of a regulated and selective exhaust gas treatment in a COD process. The cell structure (matrix) may be manufactured in any three-dimensional design of a module of any desired design, which has at least one continuous channel for the exhaust gas or the medium flowing through, as an "integral composite monolith." It is unimportant whether the continuous channel is a straight passage channel with one or more bypass channels or it has labyrinthine channel courses. Due to the type of manufacture (casting method, pressureless sintering method, blowing method, foaming method, deposition method, centrifugal casting method) used to manufacture the labyrinthine matrix 1230, it is possible to design any hollow body with at least one integral composite monolith and to guarantee the in-the-gas-flow conversion of oxidizable particles by means of the catalysts mentioned as examples.

Providing the COD Monoliths disks 1230 with Catalyst may be as follows: I) A monolith with bonding agent, wash coat, zeolite and catalyst Pt/Rh/Ce; II) A monolith with bonding agent, wash coat, zeolite and catalyst CeV, which is arranged downstream in the exhaust gas flow; III) A monolith with bonding agent, wash coat, zeolite and catalyst $V_2O_4$, which is placed farther downstream in the exhaust gas flow; and IV) A monolith with bonding agent, wash coat, zeolite and catalyst Pt/Ag arranged farther downstream. For example, monolith I, which is coated with the 1st catalyst Pt/Rh/Ce and is arranged at the exhaust or immediately behind an exhaust gas turbine, has an open-cell labyrinth structure with free channel passages for the oncoming flow and mean pentagon or polygon diameters of 4 mm. Monolith II, which is arranged downstream of monolith I in the exhaust gas flow and has the coating CeV as the 2nd catalyst, has, e.g., open-cell labyrinth structures with free channel passages of >0.5 mm. Monolith III, which is arranged downstream of monolith II in the exhaust gas flow and is coated with the catalyst $V_2O_4$ on the bonding agent and the wash coat and a zeolite based on $Al_2O_3$, has open-cell labyrinth structures with free channel passages with a mean diameter of >0.1 mm. Monolith IV, which is arranged downstream of monolith III in the exhaust gas stream and is coated with the 4th catalyst Pt/Ag on the bonding agent and the wash coat, has open-cell labyrinth structures with free channel passages with a mean diameter of <0.1 mm.

If on-board regeneration (removal of non-oxidized deposits) is required, the metallic carrier structure (matrix) is 1) thermally, 2) mechanically and 3) electrically insulated from the outer skin and adjacent monoliths. The electrical insulation is carried out in such a way that a gas-permeable nonconductor (insulator from $Al_2O_3$ or $SiO_2$) is arranged between an electrically conductive carrier each, which is also electrically insulated against the outer skin. The insulator is preferably made of $Al_2O_3$ and must not have any labyrinthine passage channels.

The labyrinthine channels may be provided with cell count increasing in the downstream direction of the integral composite monolith 123 (FIGS. 1 and 4). The large geometric and inner surfaces of the matrix webs may be greater than (>) 500 m$^2$ per dm$^3$. A high impact count of the particles with the catalysts on the matrix webs is provided. The design achieves graduated selective treatment of the particles and gases by catalysts with conversion in the temperature window between less than (<) 200° C. and 350° C. The arrangement achieves thermal stability of the matrix during exothermic reactions greater than (>) 1,000° C. There is no incorporation (sintering) of ashes below 800° C. with low back pressure p less than (<) 150 mbar and with the avoidance of nitrogen oxides by low oxidation and regeneration temperatures of less than (<)250° C. Regeneration, e.g., by the injection of $H_2O$, $H_2$, HC, $NO_2$, $O_3$, etc may be provided. There is an avoidance of CO, $NO_x$, $O_3$ and of secondary emissions such as dioxin.

To make it possible to form a large number of passage channels, the wall thicknesses of the matrix webs must be made very thin. It was possible to demonstrate by investigations that wall thicknesses of <30 μm can be obtained by the pressureless sintering of fine metal powders based on the alloy FeCrVSiB. The metal powders from which the metallic matrices are sintered have particle powder fractions with particle size distributions between 600 nm and a maximum of 40 μm. The matrices were made from the materials $FeCr_{23}V_7Si_{1.5}B_1Y_{0.8}$ or $FeCr_{23}V_7Ce_3Si_{1.5}B_1Y_{0.8}$. The mean particle diameter of the metal fraction has a diameter $d_{50}$ below 10 µm. Similar carrier structures can also be produced by centrifugal casting from $FeCr_{23}V_7Si_{1.5}B_1Y_{0.8}$ or $FeCr_{23}V_7Ce_3Si_{1.5}B_1Y_{0.8}$.

Figure 10:
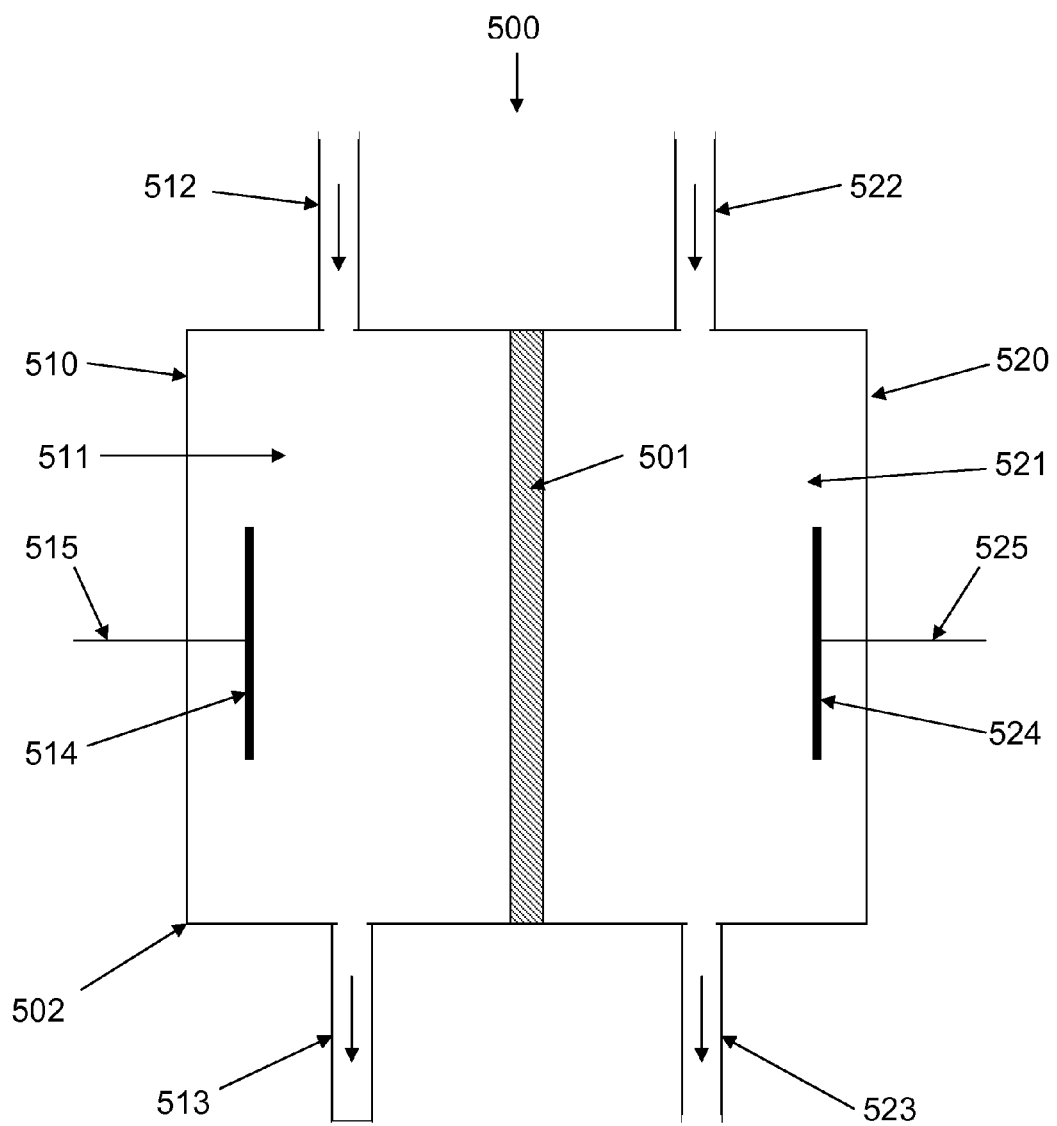
FIG. 10 is a schematic view of a fuel cell using a matrix according to the invention.

FIG. 10 shows a fuel cell 500 with a fuel ceU matrix membrane 501 defined in a fuel cell housing 502 wit fuel cell electrolyte chamber 510, fuel cell electrolyte 511, fuel cell electrolyte inlet 512, fuel cell electrolyte outlet 513, fuel cell electrolyte electrode 514, fuel electrolyte electrode conductor 515. The fuel cell 500 has an oxidizer electrolyte housing 520, an oxidizer electrolyte 521, an oxidizer electrolyte inlet 522, an oxidizer electrolyte outlet 523 and an oxidizer electrolyte electrode 524 and an electrolyte electrode conductor 525. One or both of the electrodes 514 and 524 my be a sintered structure made of the fine metal powders based on the alloy FeCrVSiB ($FeCr_{23}V_7Y_1$, $FeCr_{23}V_7Ce_1$ or FeCrVSi, $FeCr_{23}V_7Y_1$ or $FeCr_{23}V_7Ce_1$) with a catalyst such as described above and applied as discussed above.

While specific embodiments of the invention have been shown and described in detail to illustrate the application of the principles of the invention, it will be understood that the invention may be embodied otherwise without departing from such principles.

What is claimed is:

1. A device for oxidizing carbon particles and for decomposing chemical compounds contained in an exhaust gas stream resulting from internal combustion engines, containing oxygen at temperatures between 150° C. and 350° C. by converting the gas stream into gaseous oxidation products, the device comprising:
   at least one converter chamber for a catalytic treatment of the gas stream; and
   a catalyst body provided within said converter chamber with cylindrical profiled carrier matrix profiles designed within said catalyst body with a heat-resistant and thermodynamically stable, integral labyrinth carrier material defining at least a portion of said profiles selected from a group consisting of FeCrVY, FeCrVCe and FeCrVSiY with a plurality of passage channels also provided on said profiles, exhaust gas stream loaded with particles containing carbon flowing through said channels, a plurality of said carrier matrix profiles being arranged essentially in parallel to one another, wherein:
   said catalyst body includes a stabilizer plate and a module plate held at a spaced location from said stabilizer plate by spacer elements, and a baseplate which holds said cylindrical profiled carrier matrix profiles and closes said catalyst body, said cylindrical profiled carrier matrix profiles being held in position by connecting rods in spacer tubes or other holding elements and form a modular assembly unit which can be pushed into a converter chamber interior space of said converter chamber and can be pulled out of said converter chamber interior space, said catalyst body also includes at least one converter chamber outlet catalyst carrier matrix layer dimensioned corresponding to an inner cross-sectional area of said converter chamber, said converter chamber outlet catalyst carrier matrix layer covering said baseplate and peripheral openings thereof and being formed of a material FeCrV which exerts an oxidation catalytic action on its surface at temperatures below 400° C., in a state coated with CeV at temperatures below 350° C. and in conjunction with a PtCe-coated monolith module at temperatures below 300° C., and has openings, which are dimensioned corresponding to dimensions of solid particle agglomerates of said particles, said converter chamber outlet catalyst carrier matrix layer being arranged in front of said baseplate.

2. A device in accordance with claim 1, further comprising a catalyst carrier matrix monolith module with a carrier formed from a group consisting of FeCrVY, FeCrVCe and FeCrVSiY, said monolith module having a plurality of passage channels, said monolith module provided in or at an intake entrance of said converter chamber.

3. A device in accordance with claim 1, wherein:
   said integral labyrinth carrier material forms a matrix of said cylindrical profiled carrier matrix profiles consisting of sintered porous 3D mat from FeCrVY fibers, which have a mean fiber diameter of <35 µm with a catalytically active limiting quantity of 2 g per $dm^3$ relative to a geometric area of 4 $m^2/dm^3$.

4. A device in accordance with claim 1, wherein:
   said integral labyrinth carrier material forms a matrix of said cylindrical profiled carrier matrix profiles formed from a basic material of said FeCrV and said cylindrical profiled carrier matrix profiles include a catalyst based on CeV on a porous surface of said matrix.

5. A device in accordance with claim 1, wherein:
   said integral labyrinth carrier material forms a matrix of said cylindrical profiled carrier matrix profiles manufactured from a basic material of said FeCrY by sintering carrier material powder to form said matrix permeable to gas, and a catalytic material is applied on a surface of said matrix through which gas flows.

6. A device in accordance with claim 1, wherein:
   said integral labyrinth carrier material forms a matrix of said cylindrical profiled carrier matrix profiles manufactured from a powder material FeCrV and is coated at least on a surface through which gas flows with a catalyst CeV, said matrix being surrounded by at least one support tube, which has substantially larger passage openings than said passage channels of said cylindrical profiled carrier matrix profiles, wherein said cylindrical profiled carrier matrix profiles are connected to said support tube.

7. A device in accordance with claim 1, wherein:
   said integral labyrinth carrier material forms a matrix of said cylindrical profiled carrier matrix profiles manufactured from a basic material of said FeCrV to form an open-cell carrier and is coated with a catalyst based on CeV at least on its surface through which gas flows to exert an oxidation catalytic action, said matrix being arranged between two support tubes and held by said support tubes, said support tubes having substantially larger openings than openings of said matrix.

8. A device in accordance with claim 1, wherein:
   said integral labyrinth carrier material forms a matrix of said cylindrical profiled carrier matrix profiles manufactured from a basic material of said FeCrV have at least 2 g/$dm^3$ of CeV (cerium vanadate) deposited by sol-gel deposition or plasma coating.

9. A device in accordance with claim 1, wherein:
   said cylindrical profiled carrier matrix profiles are connected to a module plate detachably and are detachably connected or bolted to said module plate or are connected to said module plate via mounting flanges.

10. A device in accordance with claim 1, wherein:
   said converter chamber or a wall of said converter chamber is joined on one side by a preferably conical inlet chamber, which expands from a cross-sectional area ($q_1$) of a tube to an inner cross-sectional area ($q_2$) of said converter chamber, and is joined on another side by an outlet chamber, which tapers from said cross-sectional area ($q_2$) of said converter chamber to a cross-sectional area ($q_1$) of a closing tube wherein at least one of said inlet and outlet chambers is detachably connected to said converter chamber or to said wall of said converter chamber.

11. A device in accordance with claim 1, wherein:
said converter chamber outlet catalyst carrier matrix layer is arranged between two gas permeable brackets, by which said converter chamber outlet catalyst carrier matrix layer is held and stabilized.

12. A device in accordance with claim 2, wherein: said catalyst carrier matrix monolith module is formed by a plurality of porous layers in the form of disks or profiles or a plurality of disk-shaped individual catalyst carrier matrix monolith bodies.

13. A device in accordance with claim 12, wherein:
said individual catalyst carrier matrix monolith bodies are manufactured from catalyst material having a fine-pored, open-cell characteristics (precursor/spun type casting) and including oxidation catalytic traits at least on its surface.

14. A device in accordance with claim 12, wherein:
said plurality of individual catalyst carrier matrix monolith bodies, which form said catalyst carrier matrix monolith module, are made of catalyst materials which differ from one another in their structure and/or pore size and/or in their material (metallic, nonmetallic, hybrid) and exert oxidation catalytic action at least on each of their surfaces.

15. A device in accordance with claim 2, wherein:
cell walls of said cylindrical profiled carrier matrix profiles contain FeCrVCe/catalyst (cerium vanadate) in an amount ranging from 20–100%; and
said catalyst carrier matrix monolith module comprises individual catalyst carrier matrix monolith bodies of said heat-resistant and thermodynamically stable, integral labyrinth carrier material and are identical or different in their structure (cell size, material, coating).

16. A device in accordance with claim 8, in which $V_2O_4$ is also present, besides said CeV.

17. A device in accordance with claim 8, in which said cerium is partially replaced with other lanthanides and/or Y.

18. A device in accordance with claim 8, in which said carrier material is one of a ferritic steel, a ferritic metal foam and a spin casting.

19. A device in accordance with claim 18, in which said ferritic steel contains one of a chromium, vanadium and rare earths.

20. A device in accordance with claim 1, in which a mixture of $CeVO_4$ and $V_2O_5$ is applied as a melt to said carrier material.

21. A device in accordance with claim 1, in which $CeVO_4$ and $V_2O_5$ are provided as a second layer over a first layer of a bonding agent to define said cylindrical profiled carrier matrix profiles.

22. A device in accordance with claim 1, wherein a plurality of webs of said labyrinth carrier material are made from a metal alloy $FeCr_{23}V_7Si_{1.5}B_1Y_{0.8}$ or $FeCr_{23}V_7e_3Si_{1.5}B_1Y_{0.8}$, and said metal alloy is coated with at least one bonding agent including one of Al or Cu, a wash coat including a $Al_2O_3$, a zeolite including one of $Al_2O_3$ or $SiO_2$ and a catalyst CeV.

23. A device in accordance with claim 1, further comprising coatings on said carrier material to increase a surface from 0.8 $m^2$ to more than 500 $m^2$ per $dm^3$, said coatings consisting of a bonding agent, selected from one or more of Cu, Al or Si and a surface-active wash coat of $Al_2O_3$ and a zeolite selected from a group $Al_2O_3$ or $SiO_2$ with a surface of 400–1,000 $m^2$ per g, and a catalyst including one or more of Pt/Rh/Ce, CeV, $V_2O_4$, Pt/Ag.

24. A device in accordance with claim 22, wherein said bonding agent
provides long-term strength between said labyrinth carrier material and said catalyst/absorber,
an enlargement of a surface of said carrier matrix profiles and a catalytic activator formed on said surface,
an $NO_x$ binder and
selective hydrocarbon exchanger of HC into $H_2O$ and $CO_2$, and
a carrier substrate for a blocking catalyst.

25. A device in accordance with claim 22, further comprising layers of coating on said carrier material consisting of a bonding agent, selected from one or more of Cu, Al or Si and a surface-active wash coat of $Al_2O_3$ and a zeolite selected from a group of $Al_2O_3$ or $SiO_2$ with a surface of 400–1,000 $m^2$ per g.

26. A device in accordance with claim 1, further comprising a catalyst on said carrier material, said catalyst comprising one or more of $Pt_{45}/Rh_{50}/Ce_5$; $Ce_{50}V_{50}$; $V_2O_4$; and $Pt_{45}/CeV/Ag_7$.

27. A device in accordance with claim 2, wherein a catalyst of said catalyst carrier matrix monolith module is one or more of $Pt_{45}/Rh_{50}/Ce_5$; $Ce_{50}V_{50}$; $V_2O_4$; and $Pt_{45}/CeV/Ag_7$ and said carrier matrix profiles have another catalyst that is one or more of $Pt_{45}/Rh_{50}/Ce_5$; $Ce_{50}V_{50}$; $V_2O_4$; and $Pt_{45}/CeV/Ag_7$.

28. A device in accordance with claim 2, wherein said catalyst body comprises a plurality of layers including an integral cascade monolith, with a bonding agent, a wash coat, a zeolite, and one or more of Pt, Rh and Ce defining a layer of said catalyst body, an integral cascade monolith, with a bonding agent, a wash coat, a zeolite, and CeV defining another layer of said catalyst body, an integral cascade monolith, a bonding agent, a wash coat, a zeolite and $V_2O_4$ defining yet another layer of said catalyst body, and an integral cascade monolith, a bonding agent, a wash coat, a zeolite and one or more of Pt and Ag defining further yet another layer of said catalyst body.

29. A device in accordance with claim 28, wherein said bonding agent of said catalyst body is a material which builds up adhesion between two materials that have no or poor adhesion between said two materials including one or more of Pt and Rh in adherence to $FeCr_{23}V_7Si_{1.5}B_1Y_{0.8}$ and $FeCr_{23}V_7Ce_3Si_{1.5}B_1Y_{0.8}$.

* * * * *